US011868093B2

(12) United States Patent
Stark

(10) Patent No.: US 11,868,093 B2
(45) Date of Patent: Jan. 9, 2024

(54) METHOD AND SYSTEM FOR MANUFACTURING A TIMEPIECE PROVIDED WITH A PERSONALIZED DECORATION

(71) Applicant: ETA SA Manufacture Horlogere Suisse, Grenchen (CH)

(72) Inventor: Stefan Stark, Preles (CH)

(73) Assignee: ETA SA Manufacture Horlogere Suisse, Grenchen (CH)

(*) Notice: Subject to any disclaimer, the term of this patent is extended or adjusted under 35 U.S.C. 154(b) by 574 days.

(21) Appl. No.: 17/047,218

(22) PCT Filed: Mar. 25, 2019

(86) PCT No.: PCT/EP2019/057452

§ 371 (c)(1),
(2) Date: Oct. 13, 2020

(87) PCT Pub. No.: WO2019/201562

PCT Pub. Date: Oct. 24, 2019

(65) Prior Publication Data

US 2021/0141344 A1 May 13, 2021

(30) Foreign Application Priority Data

Apr. 18, 2018 (EP) .................................... 18167900

(51) Int. Cl.
*G04D 3/00* (2006.01)
*G04B 45/00* (2006.01)

(52) U.S. Cl.
CPC ....... *G04D 3/0097* (2013.01); *G04B 45/0076* (2013.01)

(58) Field of Classification Search
CPC ............... G04D 3/0097; G04D 3/0074; G04B 45/0076; G04B 37/22
See application file for complete search history.

(56) References Cited

U.S. PATENT DOCUMENTS

2003/0210291 A1* 11/2003 Kasahara ............. B41J 3/40731 347/9
2005/0119944 A1* 6/2005 Harasaki ............ G06Q 30/0643 705/26.5

(Continued)

FOREIGN PATENT DOCUMENTS

CN 1272185 A 11/2000
CN 102015323 A 4/2011

(Continued)

OTHER PUBLICATIONS

Korean Office Action dated Apr. 14, 2022 in Korean Patent Application No. 10-2020-7029713 (with English translation), 12 pages.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A method that is for manufacturing a timepiece provided with a personalized decoration, visible in particular when the timepiece is worn, includes constructing the timepiece and producing the personalized decoration on all or part of a body of the timepiece. Producing the personalized decoration includes selecting from a human-machine interface of an electronic device a single portion of a reference digital graphical representation, in particular of an ephemeral reference digital graphic representation, and applying a coating of decorative material on all or part of the body of the timepiece as a function of the descriptive characteristics of the selected single portion.

19 Claims, 1 Drawing Sheet

(56) References Cited

U.S. PATENT DOCUMENTS

| | | | | |
|---|---|---|---|---|
| 2005/0126917 | A1 * | 6/2005 | Morimoto | G04D 3/0092 368/283 |
| 2007/0274163 | A1 * | 11/2007 | Wild | G04B 37/1426 368/316 |
| 2010/0023165 | A1 | 1/2010 | Snyder | |
| 2011/0048256 | A1 * | 3/2011 | Atta | B44C 1/105 101/45 |
| 2014/0242273 | A1 * | 8/2014 | Poffet | G04B 15/14 427/164 |
| 2017/0205806 | A1 * | 7/2017 | Chaphalkar | G05B 19/4097 |

FOREIGN PATENT DOCUMENTS

| | | | | | |
|---|---|---|---|---|---|
| CN | 103376732 | A | | 10/2013 | |
| CN | 103930838 | A | | 7/2014 | |
| CN | 105974767 | A | | 9/2016 | |
| CN | 107203122 | A | * | 9/2017 | C22C 19/05 |
| CN | 107203122 | A | | 9/2017 | |
| CN | 207087667 | U | | 3/2018 | |
| JP | 58-120189 | A | | 7/1983 | |
| JP | 11-305650 | A | | 11/1999 | |
| JP | 2002-183408 | A | | 6/2002 | |
| JP | 2016-83206 | A | | 5/2016 | |
| JP | 2017-194728 | A | | 10/2017 | |
| JP | 2017194728 | A | * | 10/2017 | |

OTHER PUBLICATIONS

Chinese Office Action dated Jun. 17, 2021 in Chinese Patent Application No. 201980026388.3 (with English translation), 15 pages.

Office Action dated Nov. 9, 2021 in corresponding Japanese Patent Application No. 2021-503201 (with English Translation), 15 pages.

Japanese Office Action dated Apr. 12, 2002 in Japanese Patent Application No. 2021-503201 (with English translation), 8 pages.

Anonymous, "Montres personnalisables par Intermedia Time," Dec. 31, 2014, Retrieved from the Internet: http://www.intermediatime.com/presta/fra/montres-personnalisables.html, XP 055533266 (6 total pages).

Audic, A-M. et al., "Pierre Faure. s.j.: 1904-1988: vers une pedagogie personnalisee et communautaire", Jan. 1, 1998, Retrieved from the Internet: file:///C:\Users\MM53090\AppData\Roaming\Mozilla\Firefox\Profiles\MM53090\CiteNPLTemp\CiteNPL W ebPage.pdf, XP 055533281, (5 total pages).

TheWATCHES.tv. "Bamford Watch Department Or How To Fully Customise Your Watch", Youtube, Mar. 11, 2016, Retrieved from the Internet: https:/ /www.youtube.com/watch?v=-3lgvkoS 1nA, XP 054978956, (1 total page).

International Search Report dated Jul. 3, 2019 in PCT/EP2019/057452 filed on Mar. 25, 2019, 3 pages.

* cited by examiner

METHOD AND SYSTEM FOR MANUFACTURING A TIMEPIECE PROVIDED WITH A PERSONALIZED DECORATION

CROSS-REFERENCE TO RELATED APPLICATIONS

The present application is a national stage entry of International Application No. PCT/EP2019/057452, filed Mar. 25, 2019, which claims priority to European Patent Application No. 18167900.2, filed on Apr. 18, 2018, the entire content and disclosure of each of which are incorporated by reference herein.

FIELD OF THE INVENTION

The invention relates to a method for manufacturing a timepiece provided with a personalized decoration and to a system using a method of that kind.

The invention also relates to a timepiece provided with a personalized decoration that may be produced using a method of that kind.

The invention further relates to a computer program comprising program code instructions for the execution of the steps of said method.

BACKGROUND OF THE INVENTION

In the prior art methods for manufacturing timepieces provided with a personalized decoration conventionally apply a decorative material coating aimed at personalizing said timepiece to each component of the latter (for example: watch bracelet links, dial) before the assembly of those components personalized in this way in order to manufacture said timepiece.

However, methods of this kind are often costly and complicated to use.

Moreover, these various methods often require a great deal of handling by the operatives, which proves time consuming and laborious given the size of the parts to be manipulated.

SUMMARY OF THE INVENTION

One of the objects of the present invention is to alleviate some or all of the disadvantages cited above by providing a method and a system for manufacturing timepieces provided with personalized decorations enabling such decorations to be produced in a rapid and simple manner by limiting manual operations, at lower cost and more rapidly.

To this end, the invention relates to a method for manufacturing a timepiece provided with a personalized decoration, visible in particular when said timepiece is worn, comprising a step of construction of the timepiece and a step of production of the personalized decoration on all or part of a body of said timepiece, said production step including the following substeps:

- selection from a human-machine interface of an electronic device of a single portion in a reference digital graphical representation constituted by a limited number of single portions each of which can be selected only once, and
- application of a coating of decorative material to all or part of the body of the timepiece as a function of the descriptive characteristics of said selected single portion.

Thanks to these features, the personalized decoration is therefore unique and is directly chosen by the wearer of the watch. Moreover this decoration is applied after the assembly of the components of said timepiece and therefore after the construction of the latter, which contributes to facilitating and reducing the cost of a timepiece of this kind provided with a personalized decoration.

In other embodiments:

- the production step comprises a substep of effecting a selection from the human-machine interface of the electronic device of the reference digital graphical representation from a plurality of digital graphical representations each including a limited number of selectable single portions archived in a database of a server;
- the production step comprises a substep of updating information data associated with said reference digital graphical representation aimed at modifying information contained in said data relating to the remaining single portion or portions for said reference digital graphical representation following the selection of the single portion during the selection substep;
- the selection substep comprises a phase of definition of the selection of said single portion as a function of descriptive data relating to a zone of application of the personalized decoration defined on an external face of the body of the timepiece;
- the application substep comprises a phase of generation by the server of at least one control instruction of the decorative material coating application device as a function of the descriptive characteristics of the selected single portion;
- the application substep comprises a phase of deposition of at least one layer of material on the defined zone of application of the personalized decoration in the external face of the body of the timepiece in particular in the external face located on the back of said timepiece;
- the deposition phase is executed as a function of said at least one control instruction, and
- the construction step comprises a substep of assembly of a set of components constituting said timepiece in particular components transparent/translucent in whole or in part.

The invention also concerns a system for manufacturing a timepiece provided with a personalized decoration, visible in particular when said timepiece is worn, using the method according to any one of the preceding embodiments, the system comprising an electronic device provided with a human-machine interface, a server including a database comprising a plurality of digital graphical representations and a device for application of a decorative material coating, the electronic device and the device for application of a decorative material coating being connected to said server.

The invention also concerns a timepiece provided with a personalized decoration that may be manufactured by said method.

In particular, the timepiece comprises a zone for application of the defined personalized decoration in an external face of the body of the timepiece in particular in the external face located on the back of said timepiece.

The timepiece advantageously comprises a body, in particular translucent and/or transparent, through which all or part of the personalized decoration defined in the application zone of said timepiece is visible.

The invention further concerns a computer program comprising program code instructions for the execution of the steps of said method when said program is executed by control and processing units of the server and of the electronic device, respectively.

BRIEF DESCRIPTION OF THE DRAWINGS

Other particular features and advantages will emerge clearly from the following description thereof given by way of nonlimiting illustration with reference to the appended drawings in which.

DETAILED DESCRIPTION OF PREFERRED EMBODIMENTS

Figure 1:
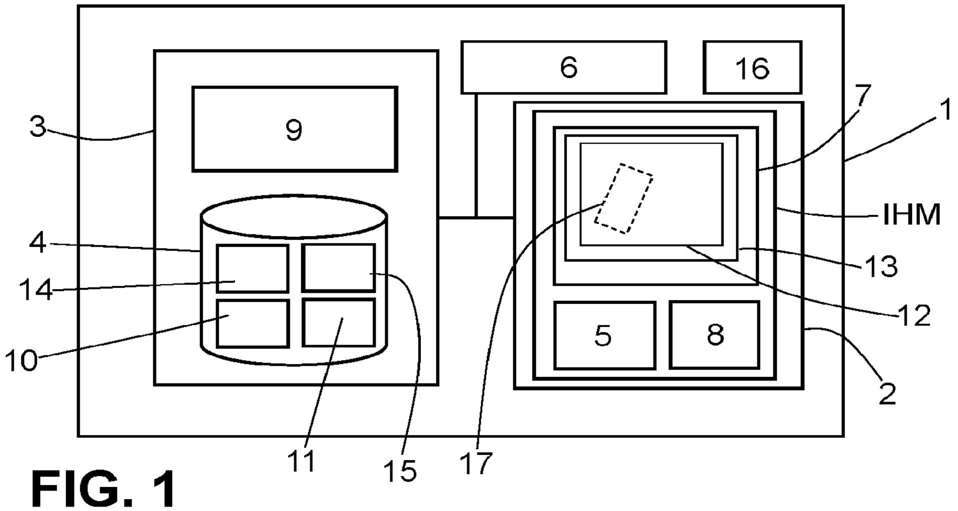
FIG. 1 is a representation of a system according to one embodiment of the invention for manufacturing a timepiece provided with a personalized decoration.
Figure 3:
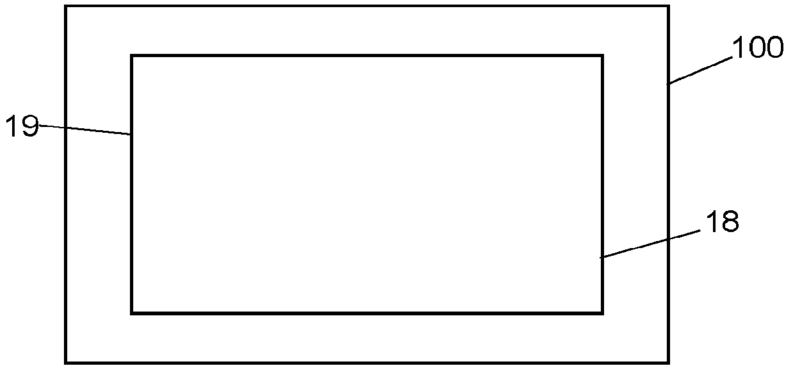
FIG. 3 represents the timepiece provided with the personalized decoration.

Referring to FIGS. 1 and 3, the system 1 for manufacturing a timepiece 100 provided with a personalized decoration 18 visible in particular when said timepiece 100 is worn, for example on the wrist of the wearer of this timepiece 100 comprises:

- an electronic device 2 comprising a human-machine interface HMI.
- a server 3 including a database 4 provided with a plurality of digital graphical representations 10, 12.
- a device 6 for application of a decorative material coating, and
- a wireless and/or cable network architecture connecting the electronic device 2 and the server 3 to one another and connecting said server 3 to the decorative material coating application device 6.

This server 3 therefore comprises the database 4, a control unit 9 and a communication unit. As stated above, this server 3 comprises a plurality of digital graphical representations 10, 12 and information data 11 archived in the database 4 in the form of digital data files. This information data 11 is associated with each of these representations 10, 12 and comprises information on the single portion or portions selectable in each of these representations, including in particular information on the number of single portions selectable. Each digital graphical representation is constituted of a limited number of single digital graphical portions selectable once only otherwise referred to hereinafter as a "single portion". Under these conditions a digital graphical representation of this kind may therefore also be referred to as an "ephemeral digital graphical representation" because when all these selectable single portions have been selected said digital graphical representation can no longer be selected and under these conditions can then be eliminated from the database 4. It will moreover be noted that there is meant by a single portion of a digital graphical representation 10, 12 a part of that representation that is different from all the other constituent parts of that representation that can be selected in the latter. In other words, a single portion 17 of this kind is different from the other single portions constituting this graphical representation. A single portion 17 of this kind may nevertheless comprise at least one fraction (but obviously not all fractions) that is common/similar to at least one fraction of one or more other single portions constituting the representation. It is therefore clear that each graphical representation comprises a limited number of single portions.

In this server 3, the control unit 9 comprises hardware and software resources, in particular at least one processor cooperating with memory elements. This control unit 9 is able to execute instructions for the implementation of a computer program aimed for example at management of the database 4 of the server 3, control of the material coating application device 6 and/or again the processing of requests/instructions/data coming from/transmitted from/to the electronic device 2, in particular its processing unit 5.

It will be noted that the control unit 9 is connected to the material coating application device 6 and to the electronic device 2 via the communication unit. A communication unit of this kind is able to implement secure communication protocols within the network architecture of this system 1.

In this system 1, the electronic device 2 may be for example a computer, a smartphone, also known in France as an ordiphone, a tablet or an electronic terminal. An electronic device 2 of this kind nonlimitingly and nonexhaustively comprises:

- a processing unit 5 comprising hardware and software resources, in particular at least one processor cooperating with memory elements,
- a screen type display module 7 that can be seen in FIG. 1 displaying a visual representation 13, described hereinafter, comprising a reference digital graphical representation 12 with the single portion 17 selected in that representation 12,
- an interface such as a loudspeaker for reproducing audio information,
- a communication interface enabling a communication link to be established between the processing unit 5 and the control unit 9 of the server 3 and data to be exchanged with that unit 5,
- a selection interface 8 such as a keyboard or a touch-sensitive interface included for example in the display module 7, and
- the human-machine interface HMI mentioned above.

In this electronic device 2, the processing unit 5 is connected inter alia to the display module 7, to the output interface, to the communication interface, to the selection interface 8 and to the human-machine interface HMI. This processing unit 5 is in particular able to execute instructions for the implementation of the computer program aimed for example at processing requests/instructions/data coming/transmitted:

- from/to the server 3, in particular from/to its control unit 9, and/or
- from/to the human-machine interface HMI.

The human-machine interface HMI of this electronic device 2 concerns all technical and cognitive means intervening from the generation of a visual representation 13 containing information relating to the digital graphical representations 10, 12 archived in the database 4 of the server 3 with a view to the display thereof on the display module 7 up to selection from the selection interface 8 of the electronic device 2 firstly of one of those digital graphical representations 10, 12 and thereafter of a single portion 17 in that selected digital graphical representation 12. To this end, an interface HMI of this kind then comprises the processing unit 5 of the electronic device 2 which is in particular able to generate a representation of information data coming from the server 3, the display module 7 intended to display the representation of the information data, the selection interface 8 with which a user of the electronic device 2 may interact. It will be noted that in this embodiment of the invention the representation of the information data is a result in particular of a stream of content data and Web application data coming from the server 3. Here the content data is contained in multimedia digital files like the digital graphical representations 10, 12 archived in the database 4 of the server 3. In the present case the Web application data enables in particular participation in the manipulation of the content data by means of a Web browser tool, here a Web browser and the human-machine interface HMI. It is clear here that the content and Web application data is archived in the database 4 of the server 3.

As stated above, the database 4 of the server 3 archives content data such as a plurality of digital graphical representations 10, 12 of which a previously selected single portion 17 has to be reproduced on the body of the timepiece 100, in particular on an external face of that body. Each digital graphical representation 10, 12 may correspond to a representation of a known or unknown picture or photograph. This digital graphical representation may be a two-dimensional 2D graphical representation or a three-dimensional 3D graphical representation generated by a design module of the system 1 that is connected to the control unit 9 of the server 3 which may include a two-dimensional/three-dimensional digitization device, or again by software executed by the control unit 9 enabling virtual modelling on the basis of photographs, images or objects, or again making it possible to design a virtual digital object (for example computer-assisted design (CAD) software).

A material coating application device 6 of this kind that can be seen in FIG. 1 comprises a printing member, a fixing member and a drive member. The printing member comprises a plurality of printing entities, in particular inkjet printing cartridges, each cartridge comprising a print head and at least one tank. In the present embodiment, each cartridge comprises at least one print head and at least one inkjet tank. In these cartridges, the ink includes at least one particle that may be contained in a fluid. A fluid of this kind is provided to transport said at least one particle onto the medium onto which it must be deposited, here the external face of the body of the timepiece 100, when it is ejected from the printing entity. A fluid of this kind may be any body able to provide this transport and/or that is also able to participate in the bonding of at least one particle to the external face of the body of the timepiece 100. This fluid may nonlimitingly and nonexhaustively be chosen from a solvent, a viscoelastic polymer, an oil, water and an aqueous solution. It will be noted that in a variant said at least one particle may be deposited on this external face without requiring a fluid of this kind to transport it. In this printing member a cartridge may comprise:

- a coloured ink including pigmented or coloured particles, or
- a clear or transparent or translucent ink, such as a lacquer, including clear or transparent or translucent particles, or
- a functional ink including functional particles and selected from the group constituted of an electroluminescent ink, a phosphorescent ink, a photoluminescent ink, a photochromic ink, an electrochromic ink, a thermochromic ink, an ionochromic ink and a mechanochromic ink.

It will be noted that a functional ink of this kind enables a personalized decoration 18 to be obtained on the external face of the timepiece 100 having physical and/or chemical functional characteristics linked for example to:

- electroluminescence;
- photoluminescence (for example a reaction to ultraviolet radiation),
- phosphorescence,
- "X-chromism" (photochromic, electrochromic, thermochromic, ionochromic, mechanochromic, etc.),
- etc.

In this context, a layer constituted of at least one functional particle and/or of at least one coloured or pigmented particle and/or at least one clear or transparent or translucent particle may nonexhaustively and nonlimitingly feature a wide range of colours thanks to the four-colour process employing basic colours such as cyan, magenta, yellow and black (the so-called "CMYK" system) enabling reproduction of this wide range of colours from three basic colours, a blue-green termed cyan, a red termed magenta and a yellow, to which colours is added the colour black.

In this material coating application device 6 the drive member is able to cause the printing member to move in different directions relative to the external face of the timepiece 100 and in particular from a zone 19 for application of the personalized decoration 18 defined on this external face. In the case of the fixing member, there is provision for fixing a layer of at least one particle or of particles on this application zone 19 of the external face or on a first layer or initial layer already present in this zone 19. This fixing member comprises a module able to emit ultraviolet UV and/or infrared radiation and/or a flow of air, in particular a flow of hot air. This module is able to generate radiation or a flow of air over all or part of the application zone 19.

Moreover, it will be noted that the system 1 comprises a support element 16 adapted to receive the timepiece 100 ready for the application of a personalized decoration 18 of this kind to its body.

Figure 2:
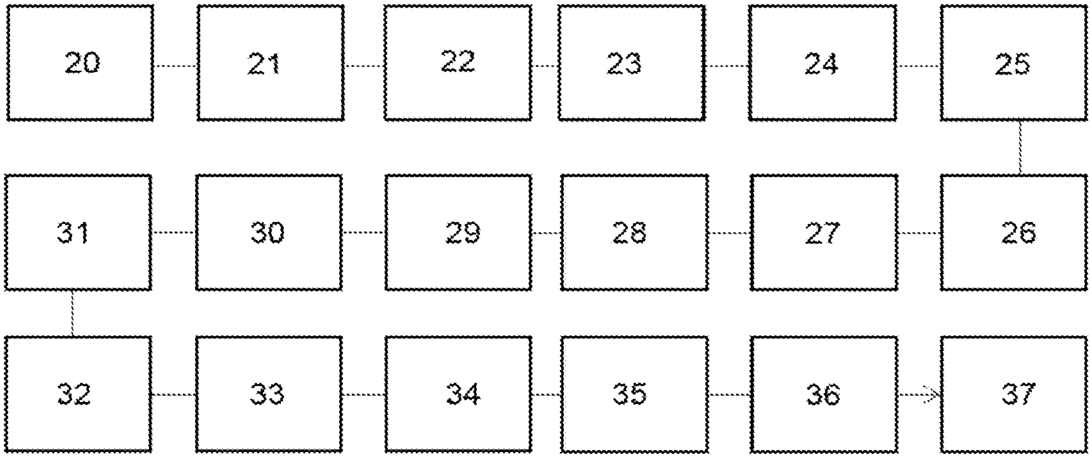
FIG. 2 is a flowchart relating to a method according to one embodiment of the invention for manufacturing the timepiece provided with the personalized decoration.

Referring to FIG. 2, this system 1 employs a method for manufacturing the timepiece 100 provided with the personalized decoration 18.

A method of this kind comprises a step 20 of construction of the timepiece. A step 20 of this kind comprises a substep 21 of assembling all of the components constituting said timepiece 100. Some components of this timepiece 100 are preferably transparent/translucent in whole or in part, in particular those through which the personalized decoration 18 defined in the application zone 19 is visible in whole or in part. Under these conditions, these components nonlimitingly and nonexhaustively comprise:

- a watch bracelet of the timepiece 100 and in particular the links that constitute it,
- a middle,
- a back of a casing of this timepiece,
- a dial,
- a bezel, and
- a clock movement of this timepiece.

In a variant, all the components of the timepiece 100 are transparent/translucent in whole or in part.

A step 20 of this kind therefore enables a timepiece 100 to be obtained the body of which is transparent/translucent in whole or in part in order to render visible by transparency/translucency all or part of the defined personalized decoration 18 in the application zone 19.

The method then provides a step 22 of producing the personalized decoration 18 on all or part of the body of said timepiece 100, in particular on the application zone 19 of this timepiece 100. This step 22 comprises a substep 23 of arranging the constructed timepiece 100 on the support element 16 of the system 1 pending application of the personalized decoration 18 to its body and in particular to the application zone 19 of this timepiece 100.

Thereafter, this production step 22 comprises a substep 24 of generation of descriptive data 14 relating to the zone 19 for application of the personalized decoration 18 on the external face of the body of the timepiece 100. This substep 22 comprises a phase 25 of definition of the parameters characterizing this application zone 19, the parameters relating nonlimitingly and nonexhaustively to the shape, the area, the depth and/or the perimeter of this application zone 19. These parameters may be entered from the human-machine interface HMI of the electronic device 2 and then transmitted to the control unit 9 of the server 3 which then generates the descriptive data 14 proper to this application zone 19 and then archives it in the database 4. It will be noted that such parameters may already be archived in this database 4 of the server 3.

This step 22 comprises a substep 26 of diffusion by the electronic device 2 of digital graphical representations 10, 12 contained in the database 4 of the server 3. During this substep 26 a secure communication link is established via the communication module and the interface between the electronic device 2 and the server 3, more particularly between the processing unit 5 of the electronic device 2 and the control unit 9 of the server 3. Under these conditions, the control unit 9 of the server 3 then transmits to the processing unit 5 of the electronic device 2 the content data including in particular the plurality of digital graphical representations 10, 12 and the Web application data archived in the database 4 of the server 3. From data of this kind the processing unit 5 of the electronic device 2 then generates a visual representation 13 containing the information relating to the digital graphical representations 10, 12 with a view to the display thereof on the display module 7 of the electronic device 2. It is very clear that each digital graphical representation 10, 12 contained in this visual representation 13 necessarily includes at least one selectable single portion. In other words, during this substep 26, upon generation of the visual representation 13, the control unit 9 selects in the database 4 the digital graphical representations 10, 12 for which the associated information data 11 comprises information specifying that each of them includes at least one selectable single portion. It will be noted that this selection by the control unit 9 may be carried out as a function of the descriptive data 14 relating to the application zone 19, i.e. that each graphical representation must comprise at least one selectable single portion having characteristics compatible with the descriptive data 14 characterizing this application zone 19.

Thereafter, this production step 22 comprises a substep 27 of making a selection from the human-machine interface HMI of a reference digital graphical representation 12 from the plurality of digital graphical representations 10, 12 included in the visual representation 13. It will be noted here that the selected graphical representation is qualified as a reference representation because it thereafter provides the basis for the production of the personalized decoration 18 on the timepiece 100. During this substep 27 the selection interface 8 is then manipulated by the user of the electronic device 2 in order to select this reference digital graphical representation 12 from the digital graphical representations 10, 12 included in the visual representation 13 displayed on the display module 7 of this electronic device 2. Thereafter, the control unit 9 of the server 3 then transmits to the processing unit 5 of the electronic device 2 the content data including the reference digital graphical representation 12 and the Web application data that are archived in the database of the server 3. On the basis of data of this kind, the processing unit 5 of the electronic device 2 then generates a visual representation 13 containing the information relating to this reference digital graphical representation 12 with a view to its display on the display module 7 of the electronic device 2. It will be noted that this reference digital graphical representation 12 of the visual representation 13 includes only all the selectable single portions constituting this graphical representation. In this context, each selectable single portion has characteristics compatible with the descriptive data 14 characterizing the zone 19 for application of the personalized decoration 18 defined on the external face of the body of the timepiece 100.

Furthermore, once the single portion 17 has been selected, the production step 22 then executes a substep 28 of updating the information data 11 associated with said reference digital graphical representation 12 aimed at modifying information included in that data bearing on the remaining single portion or portions for said reference digital graphical representation 12 following the selection of the single portion 17 during the selection substep 29.

A substep 28 of this kind enables prevention of otherwise possible selection of the same single portion, in particular for timepieces comprising application zones having the same descriptive data 14.

The production step 22 also executes a substep 29 of selection of the single portion 17 in the reference digital graphical representation 12 constituted by a limited number of single portions each of which can be selected only once from the human-machine interface HMI of the electronic device 2. In other words, the production step 22 executes a substep 29 of selection of the single portion 17 in the reference digital graphical representation 12 constituted by a limited number of at least one single portion which can be selected only once from the human-machine interface HMI of the electronic device 2.

This reference graphical representation 12 is archived in the database 4 of the server 3.

This substep 29 comprises a phase 30 of definition of the selection of the single portion 17 as a function of descriptive data 14 relating to the zone 19 for application of the personalized decoration 18 on the external face of the body of the timepiece 100. This definition phase 30 contributes to defining the single portion 17 to be selected in the reference digital graphical representation 12, notably in that the personalized decoration 18 applied to the body of said timepiece 100 covers the application zone 19 substantially completely.

This selection substep 29 then comprises a phase 31 of actuation of the selection interface 8 which is then manipulated by the user of the electronic device 2 in order to select this single portion 17 from the plurality of selectable single portions constituting this reference digital graphical representation 12 included in the visual representation 13 displayed on the display module 7.

Thereafter, the production step 22 comprises a substep 32 of application of the decorative material coating on all or part of the body of the timepiece 100 as a function of descriptive characteristics 15 of said selected single portion 17. This substep 32, executed by the control unit 9, includes a phase 33 of determination of these descriptive characteristics 15 that will contribute, during a generation phase 34 described hereinafter, to estimating the type or types of ink necessary to produce the personalized decoration 18 on the body of the timepiece 100 and in the evaluation of the direction of movement of the printing member. During this phase 33 the descriptive characteristics 15 that have been determined comprise for example:

- at least one dimension of the single portion 17, for example a thickness, length, width, area, volume, etc.,
- visual/aesthetic/structural i.e. visual and/or aesthetic and/or structural aspects of the single portion 17 such as the colour and/or the texture, etc., physical and/or chemical functional characteristics that the personalization decoration 18 must have, such as for example:
- electroluminescence,
- photoluminescence (for example a reaction to ultraviolet radiation),
- phosphorescence,
- "X-chromic" (photochromic, electrochromic, thermochromic, ionochromic, mechanochromic, etc.),
- etc.

The descriptive characteristics 15 determined in this way are then archived in the database 4 of the server 3.

The application substep 32 also comprises the phase 34 of generation by the server 3 of at least one control instruction of the decorative material coating application device 6 as a function of the descriptive characteristics 15 of said selected single portion 17. Said at least one instruction comprises production criteria for the reproduction of the single portion 17 on the application zone 19 of the body of the timepiece 100, in particular control criteria for the decorative material coating application device 6 and in particular for the printing member and the fixing member. These production criteria nonlimitingly and nonexhaustively comprise data relating to:

- a selection of cartridges comprising the print heads necessary for the reproduction of the single portion 17 on the application zone 19 as a function of the ink that they contain, in particular necessary for the reproduction of the characteristics relating to the visual/aesthetic/structural and/or functional aspects of the single portion 17;
- movement of the print head of each cartridge relative to the zone 19 for application of the personalized decoration 18 of the body of the timepiece 100 for the reproduction of the characteristics of the visual/aesthetic/structural and/or functional aspects of at least one dimension of the single portion 17;
- distance and/or position of the print head of each cartridge relative to the zone 19 for application of the personalized decoration 18 of the body of the timepiece 100 for the reproduction of the characteristics of the visual/aesthetic/structural and/or functional aspects of at least one dimension of the single portion 17;
- duration of positioning the print head of each cartridge relative to the zone 19 for application of the personalized decoration 18 of the body of the timepiece 100 for the production of the characteristics of the visual/aesthetic/structural and/or functional aspects of at least one dimension of the single portion 17;
- flow rate of ink ejected from the print heads, in particular the number of droplets ejected for the reproduction of the characteristics of the visual/aesthetic/structural and/or functional aspects of at least one dimension of the single portion 17.

Thereafter the application substep 32 comprises a phase 35 of deposition by the material coating application device 6 of at least one layer of material on the body of the timepiece 100, in particular on the application zone 19 of the external face of the body of the timepiece 100. This phase 35 in particular features execution by the control unit 9 of said at least one control instruction comprising the production criteria for the reproduction of the single portion 17 on the application zone 19 of the body of the timepiece 100. In the context of the application of this layer, the execution of said at least one instruction enables control of the deposition of at least one ink on this application zone 19 or on a layer of material already present in this zone 19.

This substep 32 then comprises a phase 36 of fixing the layer of material onto the application zone 19 or onto the layer of material already present in the application zone 19. During this phase 36 the control unit 9 then controls in relation to the application zone 19 the fixing member, which may for example comprise a module adapted to emit ultraviolet UV and/or infrared radiation and/or a flow of air, in particular a flow of hot air.

Thereafter, this method comprises a step 37 of removal of the timepiece 100 provided with the personalized decoration 18 from the support element 16 of the system 1 before being packaged.

It will be noted that in one embodiment of the invention the zone 19 for application of the personalized decoration 18 is on the external face of the timepiece 100 defined on the back of that timepiece. The back of that timepiece 100 may then correspond, when it is a wristwatch, to the part of the external face of the body of this watch that is in contact with the body of the wearer, here the wrist for example. Under these conditions, this application zone 19 then comprises the parts of the external face defined on the back of the bracelet and thus of the links constituting the latter and of the bottom of the casing of this timepiece. Thus for a timepiece 100 the body of which is transparent/translucent in whole or in part, the personalized decoration 18 defined in the application zone 19 is then visible by transparency/translucency when the user wears it, for example on their wrist.

The invention also relates to a computer program comprising program code instructions for the execution of the steps of the above method when said program is executed by the control unit 9 and the processing unit 5 of the server 3 and of the electronic device 2, respectively.

The invention claimed is:

1. A method of manufacturing a timepiece provided with a personalized decoration that is configured to be visible when said timepiece is worn, comprising:
- constructing the timepiece; and
- producing the personalized decoration on all or part of a body of said timepiece, said producing including the following:
  - receiving, via an electronic device, a plurality of digital graphic representations, each of the digital graphic representations including a limited number of single portions,
  - selecting, from a human-machine interface of the electronic device, a single portion out of the limited number of single portions of a reference digital graphical representation from the plurality of digital graph representations, wherein each of the limited number of single portions can be selected only once from the electronic device, and
  - applying a coating of decorative material on all or part of the body of the timepiece as a function of the descriptive characteristics of said selected single portion.

2. The method according to claim 1, wherein the plurality of digital graphical representations are archived in a database of a server.

3. The method according to claim 1, wherein the producing further comprises updating information data associated with said reference digital graphical representation to modify information contained in said data relating to the remaining single portion or portions for said reference digital graphical representation following the selection of the single portion during the selecting.

4. The method according to claim 1, wherein the selecting comprises a phase of definition of the selection of said single portion as a function of descriptive data relating to a zone of application of the personalized decoration defined on an external face of the body of the timepiece.

5. The method according to claim 4, wherein the applying comprises a phase of generation by a server of at least one control instruction of a decorative material coating application device as a function of the descriptive characteristics of the selected single portion.

6. The method according to claim 5, wherein the applying comprises a phase of deposition of at least one layer of material on the zone of application of the personalized decoration in the external face of the body of the timepiece.

7. The method according to claim 6, wherein the deposition phase is executed as a function of said at least one control instruction.

8. The method according to claim 5, wherein the applying comprises a phase of deposition of at least one layer of material on the zone of application of the personalized decoration on the external face located on a back of said timepiece.

9. The method according to claim 1, wherein the constructing comprises assembling a set of components constituting said timepiece, said components being transparent/translucent in whole or in part.

10. The method according to claim 1, wherein the constructing comprises assembling a set of components constituting said timepiece, said components being transparent/translucent in whole or in part.

11. The method according to claim 1, wherein the single portion is an ephemeral reference digital graphical representation.

12. A system for manufacturing the timepiece provided with the personalized decoration that is configured to be visible when said timepiece is worn, using the method according to claim 1, the system comprising:

the electronic device provided with the human-machine interface;

a server including a database comprising the plurality of digital graphical representations; and a device configured to apply the decorative material coating, the electronic device and the device configured to apply the decorative material coating being connected to said server.

13. The timepiece comprising the personalized decoration that is manufactured using the method recited in claim 1.

14. The timepiece according to claim 13, further comprising a zone for application of the personalized decoration in an external face of the body of the timepiece.

15. The timepiece according to claim 14, wherein all or part of the personalized decoration defined in the zone of application of said timepiece is visible through the body of the timepiece.

16. The timepiece according to claim 15, wherein the body is translucent and/or transparent.

17. The timepiece according to claim 13, wherein the zone of application of the personalized decoration is located in an external face of the body located on a back of said timepiece.

18. A non-transitory computer readable medium storing program that, when executed by a computer, causes the computer to execute: the method according to claim 1.

19. The method according to claim 2, wherein, once all of the limited number of single portions of the reference digital graphical representation have been selected, the reference digital graphical representation is removed from the database.

* * * * *